(12) United States Patent
Bedetti

(10) Patent No.: US 7,182,282 B2
(45) Date of Patent: Feb. 27, 2007

(54) FLUID BED GRANULATION APPARATUS

(75) Inventor: Gianfranco Bedetti, Milan (IT)

(73) Assignee: Urea Casale S.A. (CH)

( * ) Notice: Subject to any disclaimer, the term of this patent is extended or adjusted under 35 U.S.C. 154(b) by 0 days.

(21) Appl. No.: 10/474,243

(22) PCT Filed: Apr. 12, 2002

(86) PCT No.: PCT/EP02/04102

§ 371 (c)(1),
(2), (4) Date: Oct. 8, 2003

(87) PCT Pub. No.: WO02/087776

PCT Pub. Date: Nov. 7, 2002

(65) Prior Publication Data

US 2004/0124288 A1  Jul. 1, 2004

(30) Foreign Application Priority Data

Apr. 13, 2001  (EP)  ................................. 01109204

(51) Int. Cl.
*B05B 7/06* (2006.01)
(52) U.S. Cl. ........................ 239/654; 239/424; 239/662
(58) Field of Classification Search ................ 239/398, 239/418, 590, 597, 423, 424, 654, 662; 118/303, 118/429, DIG. 5; 159/4 E, 48 R; 264/7; 422/139; 427/213

See application file for complete search history.

(56) References Cited

U.S. PATENT DOCUMENTS

| | | | | |
|---|---|---|---|---|
| 1,612,457 | A | * 12/1926 | Marron | ........................ 239/424 |
| 4,153,004 | A | 5/1979 | Barnert | |
| 4,337,722 | A | * 7/1982 | Debayeux et al. | .......... 118/303 |
| 4,354,450 | A | * 10/1982 | Nagahama et al. | .......... 118/303 |
| 5,037,616 | A | 8/1991 | Williatte et al. | |
| 6,157,774 | A | * 12/2000 | Komino et al. | .............. 392/387 |

* cited by examiner

*Primary Examiner*—Christopher Kim
(74) *Attorney, Agent, or Firm*—Akerman Senterfitt

(57) ABSTRACT

A nozzle for distributor devices of granule's growth liquid substance in fluid bed granulators, is distinguished by the fact that it comprises a first duct (2), with substantially rectilinear axis (A) and with a predetermined diameter, which duct has an end portion (3) including a supply opening (4) and made of at least two subsequent segments, a first cone-shaped segment (5) converging on the axis (A) and a further cone-shaped segment (7) diverging from the axis (A) and ending in the supply opening (4), a second duct (8) extending co-axially inside the first duct (2), with which it forms an annular space (9), the second duct (8) having a supply end (10) extended inside the first cone-shaped segment (5) of the first duct (2).

5 Claims, 2 Drawing Sheets

FLUID BED GRANULATION APPARATUS

FIELD OF APPLICATION

In its most general aspect, the present invention relates to an apparatus for fluid bed granulation processes where granules of a chosen substance are obtained through continuous growth (of both volume and mass) of granules and seeds of that substance suspended in a fluid bed, by means of a suitable growth substance in the fluid state, continuously fed in said fluid bed.

Particularly, this invention concerns a granulation apparatus comprising a container, wherein a fluid bed of seeds and granules of the chosen substance to be granulated is obtained, a device for feeding continuously said seeds in said fluid bed, a fluidification and support system of the fluid bed and at least a distributor of a flow of the growth liquid, comprising a plurality of nozzles for supplying said liquid substance in the atomized form.

More particularly, this invention relates to a supplying nozzle for the granule-growth liquid substance, usable for granulation apparatus of the above kind.

In the following description and attached claims, such apparatus will be generally addressed as granulator, while the expression: "granule's seed of a chosen substance", is generally meant to indicate particles of the substance to be granulated having dimensions equal or less than about 1,5 mm in diameter. Furthermore, to simplify, the term "seeds" will be used to indicate the granule's seeds.

PRIOR ART

It's known that to reach a good granulation outcome (prearranged granule's dimension, shape and mass) with a fluid bed process of the above type, a good "wetting" of both the seeds and the growing granules by the growth liquid is required. And, to this end, the growth liquid must be fed to the fluid bed in the form of the least possible droplets, certainly less than the seeds and the growing granules, which said droplets are to get in touch with. That's to allow, as for example with the urea, the evaporation of water or different solvent contained in the growth liquid (solution of urea), in the fastest and most complete possible way, so as to obtain a high purity final product (granules).

From this point of view, the dimension of the growth liquid droplets is so crucial that it's very advantageous, if not necessary, to feed said growth liquid in the so-called "atomized" form. In this condition, actually, the growth liquid is able to get in touch one by one with all the seeds or granules suspended in the fluid bed, and to wet evenly and in an optimal way their whole surface.

In order to atomize the growth liquid substance, the prior art granulators and, more specifically, their growth liquid supplying devices, make use of specific atomizing nozzles fed with said liquid and at the same time with large amounts of air (or other suitable gas) at high speed. Such speed is, for example comprised between 150 m/s and 300 m/s.

But, although largely used and being advantageous under some points of view, the use of the atomizing nozzle of the above mentioned type causes known drawbacks not yet overcame in the fluid bed granulation processes of the prior art. Actually, the need to work with large amounts of air (or other gas) at high speed prevents a control of the granule growth inside the fluid bed and, consequently, leads to the inability to control the final product granulometry between predetermined limited values. This entails expensive classification and screening operations of the produced granules, the recovery of granules of unacceptable size (too big or too little), and their recycle upstream to the granulation process.

SUMMARY OF THE INVENTION

The problem underlying the present invention is to devise and to make available a nozzle for distribution devices of growth liquid substance in fluid bed granulators, having structural and functional features such as to allow to obtain said growth liquid substance, first, available in a substantially atomized form and, second, supplied with so low speeds as to overcome the drawbacks linked to the prior art.

This problem is solved, according to the present invention, by a nozzle of the above-mentioned type, characterized by the fact that it comprises a first duct, with substantially rectilinear axis and with a predetermined diameter, which duct has an end portion including a supply opening and made of at least two subsequent segments, a first cone-shaped segment converging on said axis and a further cone-shaped segment diverging from said axis and ending in said supply opening, a second duct extending co-axially inside said first duct, with which it forms an annular space, said second duct having a supply end extended inside said first cone-shaped segment of said first duct.

As it will be seen in more details in the following description, thanks to such flared cone-shaped segment ending in the supply opening of said first duct, it is possible to obtain easily and effectively a drastic slowing down of the supplying speed of the air (or other gas) flow comprising the atomized growth substance and, as a result, it is possible to feed said flow with a such low speed inside the fluid bed provided with one or more nozzles of the present invention.

In this way, granule's growth inside the fluid bed is advantageously controlled and, consequently, the final product's granulometry.

Indeed, the low feeding speed allows to limit the final product granulometry inside a predetermined range of values, which is much narrower if compared to the prior art. This because it is surprisingly possible to control the seeds and granules whirling motion inside the fluid bed granulator, and therefore to control their growth.

The advantages and the features of the invention will be better shown from the description of an illustrative and non limiting embodiment of the invention, made hereinafter with reference to the enclosed drawings

SHORT DESCRIPTION OF THE DRAWINGS

DETAILED DESCRIPTION

Figure 1:
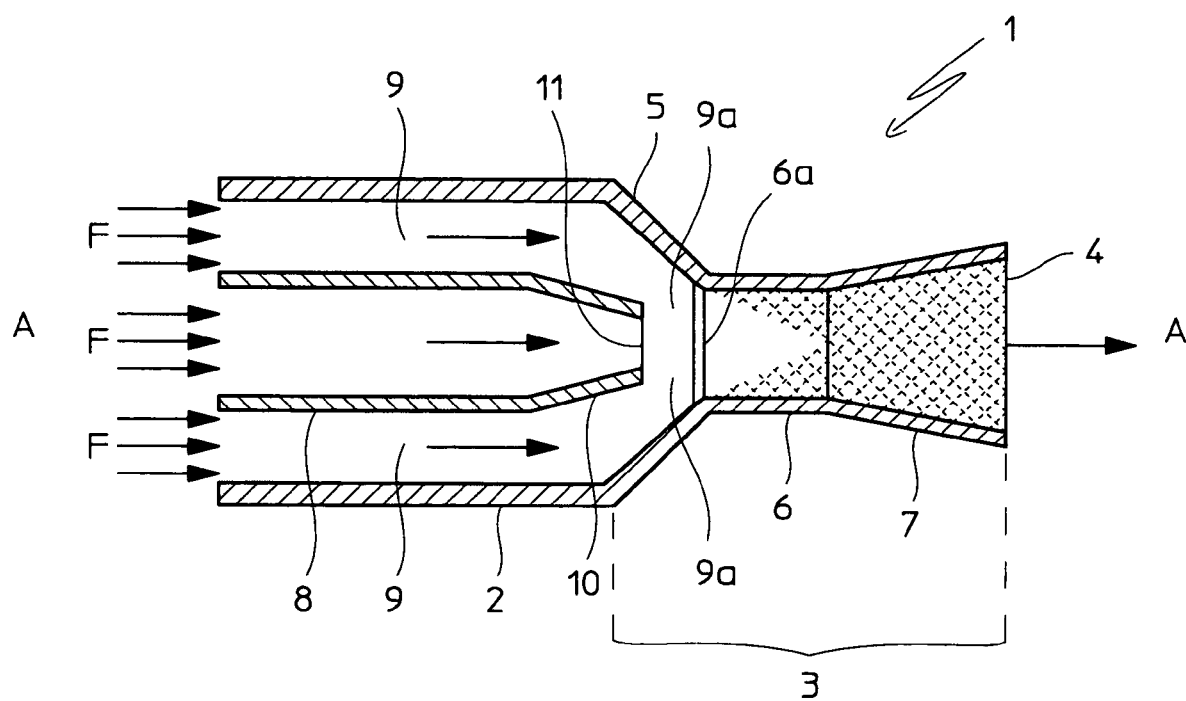
FIG. 1 shows schematically and in longitudinal section a nozzle for growth liquid distributor devices in fluid bed granulators, according to the present invention.
Figure 2:
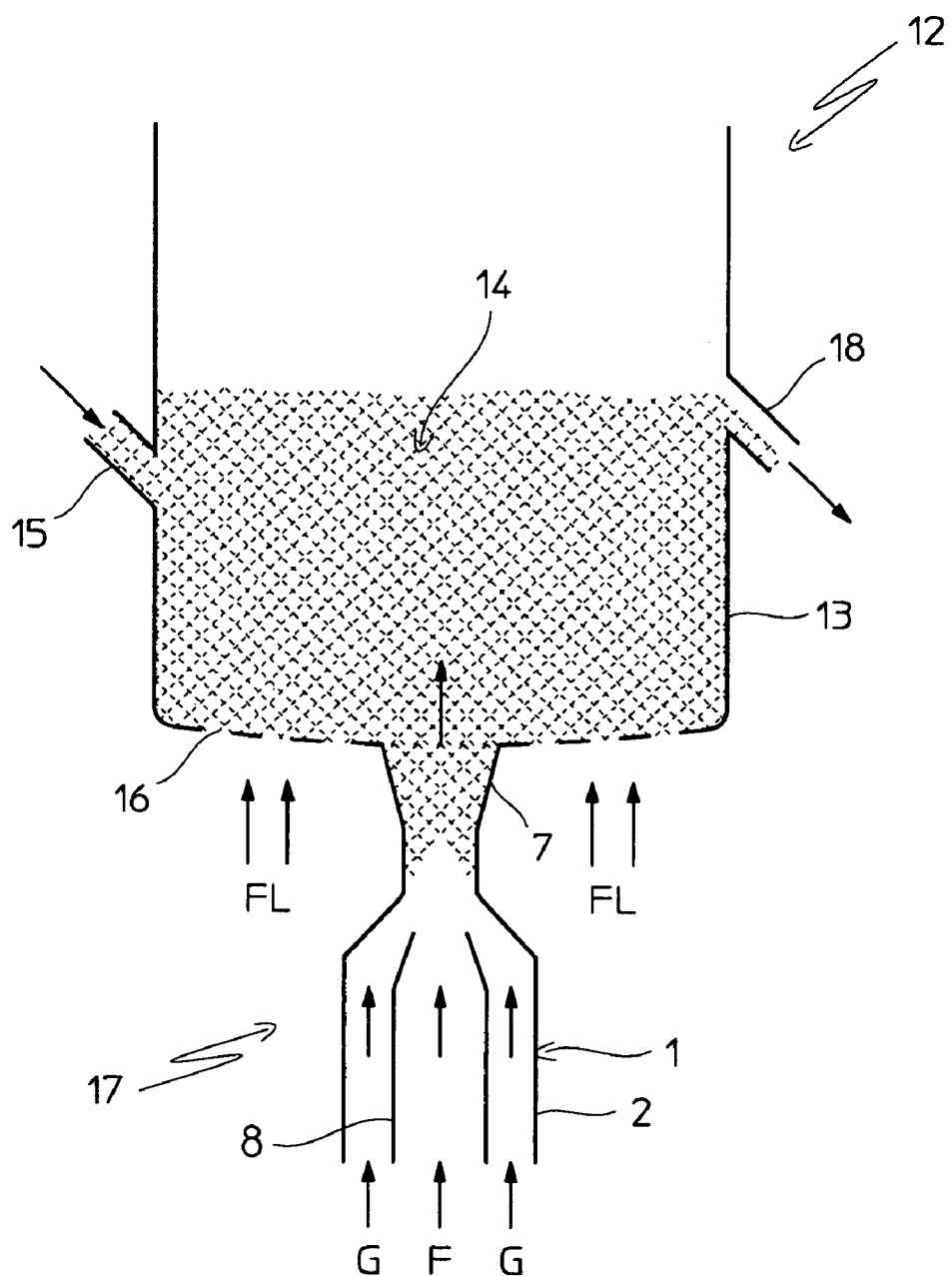
FIG. 2 shows schematically and in cross section a fluid bed granulation apparatus comprising the nozzle of FIG. 1, according to the present invention.

With reference to FIG. 1, with 1 a nozzle according to the present invention is globally indicated, which is particularly suitable for supplying a chosen granule's growth liquid substance in fluid bed granulators.

Said nozzle comprises a first duct 2, preferably cylindrical, with predetermined diameter and rectilinear axis A; said duct 2 has an end portion 3 including a supply opening 4 and is made of preferably three subsequent segments. A first cone-shaped segment 5 converging on said axis A, a second cylindrical segment 6 and a third cone-shaped segment 7 diverging from said axis A and ending in said supply opening 4 (substantially Venturi-shaped).

According to a preferred but not limiting embodiment, said cylindrical segment 6 has a diameter 0.4 times of the predetermined diameter of said first duct 2, while the cone-shaped segment 5 has a conicity greater than the one of the cone-shaped segment 7. Furthermore, the diameter of the supply opening 4 is in-between the diameter of said duct 2 and the diameter of said cylindrical segment 6.

The nozzle of the present invention comprises a second duct 8, co-axially extended inside said first duct 2, with which it forms an annular space 9. Said second duct 8 has, in the example represented by FIG. 1, cone-shaped supply end 10, converging on said axis A and extended inside the first cone-shaped segment 5 of said duct 2. Furthermore, its conicity is lower than the conicity of said cone-shaped segment 5.

According to a further embodiment of the present invention, the second duct 8 has a supply opening 11 is extended in predetermined spaced relationship from an end of the first cone-shaped segment 5 of first duct 2, corresponding to the inlet opening 6*a* of the cylindrical segment 6. Particularly, said spaced relationship is advantageously chosen so that a narrow neck 9*a* is locally formed inside space 9 to accelerate the flow of a fluid flowing in the space itself.

A nozzle according to the present invention, during a fluid bed granulation process, works as follows.

A continuous flow F of a chosen growth liquid substance is fed in duct 8 with a relatively low axial speed, between for example 2 and 10 m/s.

A continuous flow G of a chosen gas, for example air, is fed continually into the space 9 with an axial speed, between, for example, 20 and 50 m/s.

The flow G accelerates substantially in the narrow neck 9*a*, for example at a speed of 200–300 m/s and impinges the liquid substance flow F exiting from opening 11, which is so accelerated and atomized.

In particular, as a consequence of such impingement, many minute droplets of liquid substance inside the gaseous mass are continually formed, with dimensions of about (for instance) 20–120 micron. Practically, a continuous formation of a nebulized liquid/gas mixture is obtained (liquid phase dispersed into the gaseous phase).

Said mixture becomes advantageously compact inside the cylindrical segment 6, that means a uniform distribution of the growth liquid droplets inside the cross-section of flow F-G is obtained and, subsequently, slows down substantially inside the cone-shaped segment 7, with diverging conicity, to even reach a speed of 30–60 m/s.

This flow of growth liquid droplets is supplied inside the fluid bed of seeds and growing granules, at a very reduced speed as regards to that presently imposed by the prior art, with the above-mentioned advantages.

Besides, a further advantage of the present invention is that inside the flared cone-shaped segment 7, the flow pressure increases as a consequence of the speed reduction, allowing to obtain a recovery in kinetics energy and therefore a reduction of the global energy consumption required for the atomization of the growth liquid substance (compression energy of the atomization air). Such reduction in the energy consumption can be quantified as a 40–50% reduction as regards to the energy consumption caused by the prior art nozzles.

With reference to FIG. 2, a fluid bed granulation apparatus (or granulator) according to the present invention, globally indicated with 12, is very schematically and partially represented.

In that figure, details structurally and functionally equivalent to those represented in the previous figure will be indicated with the same reference numbers and will be no further described.

Granulation apparatus 12 comprises a container 13, wherein a fluid bed 14 of seeds and granules of the chosen substance to be granulated is obtained, a device for feeding continuously said seeds in said fluid bed (duct 15), a fluidification and support system of the fluid bed (perforated bottom 16 and blowing means—not represented since conventional—of fluidification air or other gaseous fluid FL) and at least a distributor device 17 for the granule's growth liquid flow F. The apparatus 12 is also provided of a device (duct 18) for the weir discharge of the final product.

Advantageously, distributor device 17 includes one (as in the example of FIG. 2) or more growth liquid supplying nozzles 1, of the described type with reference to FIG. 1.

The invention thus conceived may be susceptible to variations and modifications, all falling within the scope of protection defined in the following claims.

The invention claimed is:

1. A fluid bed granulation apparatus comprising:

a container, wherein a fluid bed of seeds and granules of the chosen substance to be granulated is obtained;

a device for feeding continuously said seeds in said fluid bed;

a fluidification and support system of the fluid bed; and at least a distributor device for a flow of granules growth liquid substance, wherein said distributor device comprises one or more supplying nozzles for said liquid substance comprising a first duct, with substantially rectilinear axis and with a predetermined diameter, wherein said duct has an end portion including a supply opening and made of at least two subsequent segments, said two subsequent segments comprising a first cone-shaped segment converging on said axis and a second cone-shaped segment diverging from said axis and ending in said supply opening, and a second duct extending co-axially inside said first duct, with which it forms an annular space, said second duct having a supply end extended and ending inside said first cone-shaped segment of said first duct.

2. The apparatus according to claim 1, wherein said end portion further comprises a cylindrical segment arranged between said two cone-shaped segments.

3. The apparatus according to claim 1, wherein said cone-shaped end portion comprises a cylindrical segment of said first duct has a conicity greater than the conicity of the further arranged between said two cone-shaped segments diverging from said axis.

4. The apparatus according to claim 3, wherein said supply opening of said second cone-shaped segment has a diameter smaller than the predetermined diameter of said first duct.

5. The apparatus according to claim 1, wherein said second duct has a supply opening extended in predetermined spaced relationship from an end of said first cone-shaped segment of the first duct, so as to locally form a flow accelerating narrow neck inside said space.

* * * * *